March 2, 1971  W. E. BULL  3,566,471
MULTISPEED DENTAL HANDPIECE AND DRIVE THEREFOR
Filed April 1, 1968  3 Sheets-Sheet 3

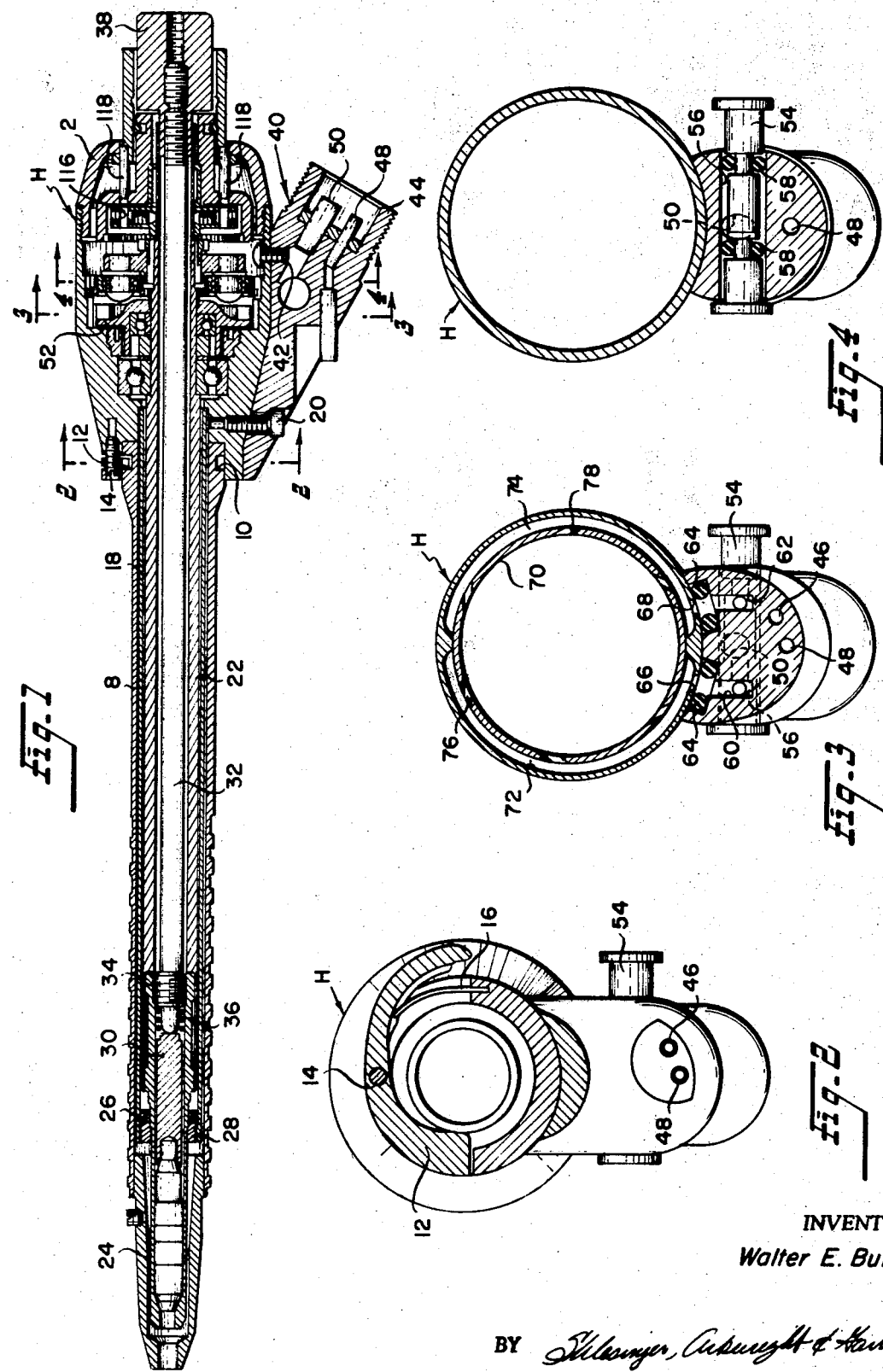

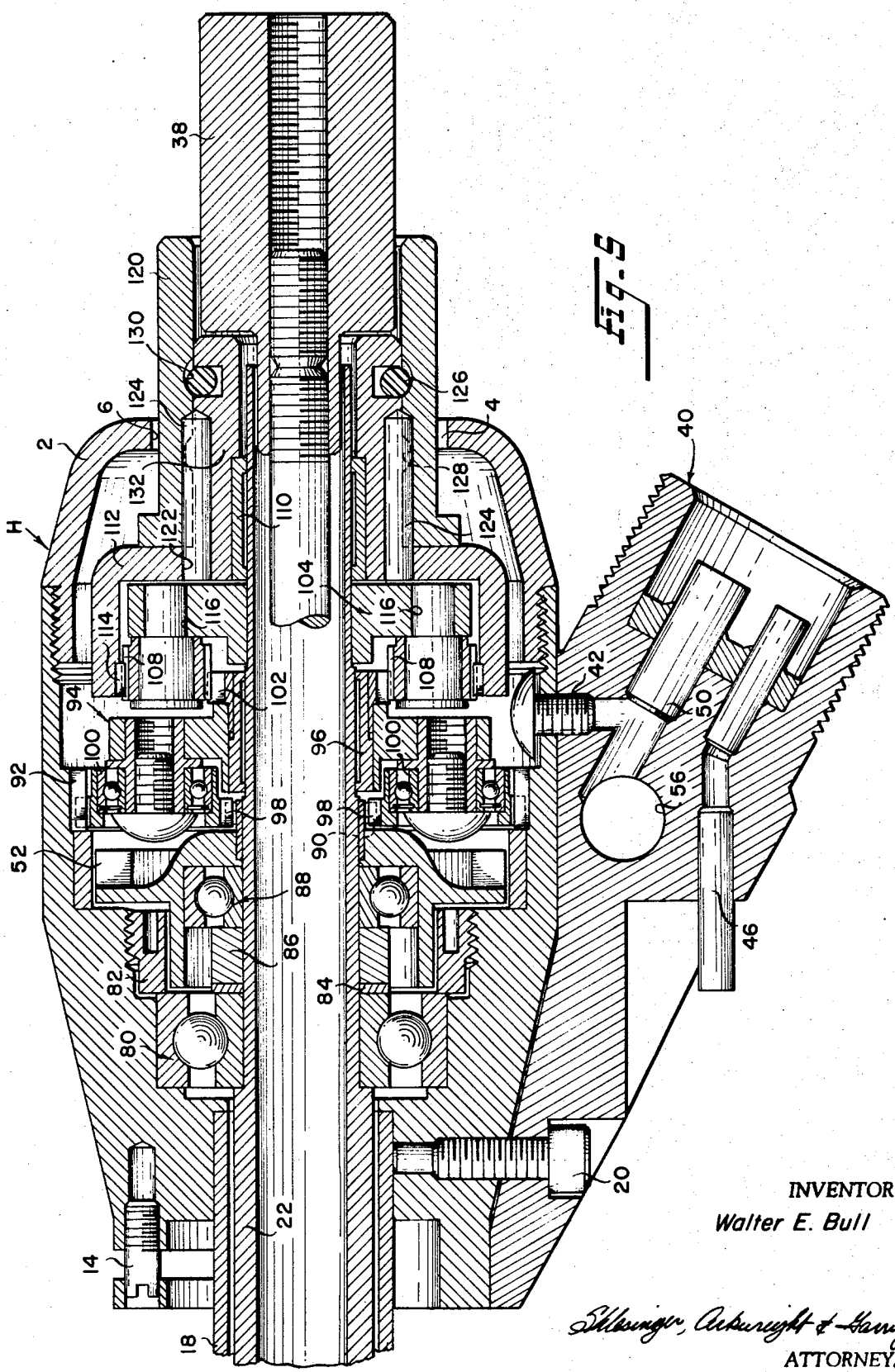

INVENTOR
Walter E. Bull

BY
ATTORNEYS

United States Patent Office 3,566,471
Patented Mar. 2, 1971

3,566,471
MULTISPEED DENTAL HANDPIECE
AND DRIVE THEREFOR
Walter E. Bull, 555 Galena St.,
Aurora, Colo. 80010
Filed Apr. 1, 1968, Ser. No. 717,590
Int. Cl. A61c 1/05; F16h 57/10
U.S. Cl. 32—26    10 Claims

ABSTRACT OF THE DISCLOSURE

A multispeed drive for dental handpieces and the like comprising a first housing; a shaft in the housing; a first stage drive assembly in the housing having a first transmitting torque value; a second stage drive assembly in the housing connected to the first stage drive assembly and to the drive shaft and having a second transmitting torque value differing from the first transmitting torque value; means for driving the first stage drive assembly; and means for shorting out the second stage drive assembly having operative and non-operative positions; thereby to selectively drive the drive shaft at different speeds.

HISTORICAL BACKGROUND

In the past, dental handpieces consisted primarily of belt driven devices. No step down gearing was provided in the handpiece itself. Furthermore, where there was a drive gear assembly, it was generally mounted on the handpiece but off to one side as with belt driven models. In turbine models, the result was a handpiece which was bulky and clumsy.

OBJECTS AND SUMMARY

It is therefore an object of this invention to produce a dental handpiece which has reduced bulk and is streamlined and well balanced.

Another object of this invention is to produce a positive drive handpiece utilizing planetary reduction gearing.

Yet another object of this invention is to provide a handpiece which has high torque at low speeds.

A further object of this invention is to provide a dental handpiece having at least two-speed ranges so as to increase the versatility of the apparatus.

Another object of this invention is to provide a handpiece with reversing capabilities.

Yet a further object of this invention is to provide a handpiece which has long life and is simple to maintain.

In summary, this invention relates to a turbine driven handpiece having planetary reduction gearing coaxially mounted on the drive shaft of the handpiece with means for manually engaging and disengaging the reduction gearing.

These and other objects of this invention will be apparent from the following description and claims.

In the drawings which illustrate the various embodiments of this invention:

FIG. 1 is a cross-sectional view of the dental handpiece;

FIG. 2 is a cross-sectional view of the housing with the innards removed taken along the line of 2—2 in FIG. 1 and viewed in the direction of the arrows;

FIG. 3 is a cross-sectional view of the innards of the housing taken along the line of 3—3 in FIG. 1 and viewed in the direction of the arrows;

FIG. 4 is a cross-sectional view of the housing with the innards removed taken along the line of 4—4 in FIG. 1 and viewed in the direction of the arrows;

FIG. 5 is an enlarged fragmentary cross-sectional view of the upper portion of the dental handpiece;

Figure 7:
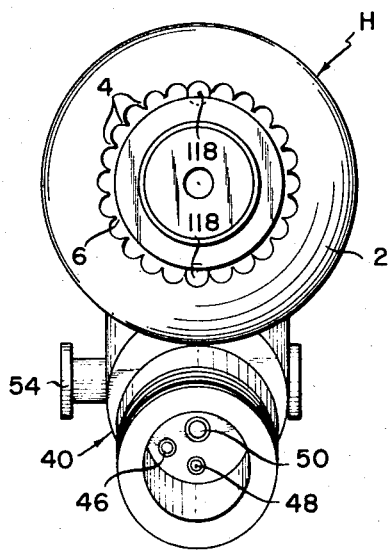
FIG. 7 is a top plan view of the handpiece.

The housing H of the handpiece includes a cap 2 threaded thereon. As best seen in FIG. 7, the cap 2 is provided with scallops 4 in a central opening 6 in the cap 2.

Secured to the bottom of the housing H is a sheath or sleeve 8. The sleeve 8 is provided with a lock groove 10 for receiving a latch 12 as best illustrated in FIG. 2. The latch 12 is secured to the housing H by means of a screw 14. A spring 16 also secured in the housing H biases the latch 12 into engagement with the lock groove 10 of the sleeve 8.

A second sleeve 18 is received within the sleeve 8 and is mounted in the housing H and secured thereto by a set screw 20. Mounted within the second sleeve 18 and extending through the housing H is a drive spindle 22.

A chuck 24 is secured to the drive spindle 22. A bearing 26 is provided between the chuck 24 and the second sleeve 18. A retainer nut 28 is provided for positive positioning of the bearing 26. The chuck 24 is provided with a plunger 30. Within the drive spindle 22 is a chuck tightening shaft 32 having at one end a screw 34 for threading into the chuck 24. A spring 36 maintains a pressure on the plunger 30 which can be adjusted by threading or unthreading the screw 34 from the chuck 24. At the opposite end of the chuck tightening shaft 32 is provided a knob 38 for manually tightening the chuck 24 on a burr or other type of dental device which may be inserted within the chuck 24.

Secured to the housing H is a switch housing 40. A set screw 42 and set screw 20 secure the switch housing 40 to the principal housing H. The switch housing 40 is provided with a coupling sleeve 44 which is connected to air and water supply (not shown).

The switch housing 40 is provided with a water connection tube 46 for providing coolant or the like to the drill or burr. An air tube 48 is also provided to provide air for special attachments and the like. A central air passage 50 directs air through the switch housing 40 to the main housing H for the purpose of driving the turbine wheel 52. The air through the passage 50 is regulated by means of a push button switch 54. Air flowing through the passage 50 enters a cross passage 56 in which the push button switch 54 is located. Spaced O-rings 58 are provided on the push button switch 54 so as to control the flow of air into the housing H by way of passageways 60 and 62 as best illustrated in FIG. 3. In order to provide a tight seal between the main housing H and the switch housing 40, O-rings 64 are provided.

The passageways 60 and 62 enter into ports 66 and 68 respectively of the housing H.

As best seen in FIG. 3, a nozzle ring 70 is provided to form a forward annulus 72 and a reverse annulus 74. The ring is provided with directional openings 76 and 78 for directing the air against the turbine 52 in order to drive it in either forward or reverse directions as determined by the positioning of the push button switch 54.

Referring now to FIG. 5, it will be noted, that a bearing ring assembly 80 is mounted in the housing H and supports the drive spindle 22. A bearing retainer 82 positively positions the bearing ring assembly 80. Shim 84 and spacer 86 position a bearing ring assembly on the drive spindle 22 so as to properly space the turbine wheel 52 on the drive spindle 22. The turbine wheel 52 is provided with a sun gear 90.

Mounted in the wall of the housing H is a first stage ring gear 92. A first stage planetary gear assembly 94 mounted on a bearing sleeve 96 supports first stage planetary gears 98 which are driven by the sun gear 90 and orbit about the ring gear 92. The planetary gear assembly 94 includes the usual bearing assemblies 100.

The first stage planetary gear assembly carries a sun gear 102. Mounted to the drive spindle 22 is a second stage planetary gear assembly 104 which is fixed to the drive spindle 22 by set screws 106. Planetary gears 108 are supported by the second stage planetary gear assembly 104 and are driven by the sun gear 102. Mounted on a bearing sleeve 110 is a second stage ring gear assembly 112 having a ring gear 114. The planetary gears 108 of the second stage planetary gear assembly 104 orbit within the ring gear 114.

Figure 6:
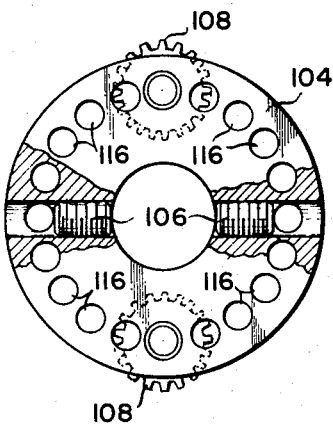
FIG. 6 is a top plan view of the second stage carrier and planet gear assembly.

As best illustrated in FIG. 6, the second stage planetary gear assembly is provided with a series of holes 116. The holes 116 are designed to receive a pin 118 as best shown in FIG. 1. The pin 118 may have a counterpart (not shown) on the opposite side of a clutch assembly sleeve 120 to which the pins 118 are secured. The pins 118 pass through holes 122 in the second stage ring assembly 112. The clutch 120 is frictionally secured and positively positioned with respect to the second stage ring gear assembly 112 by means of pins 124. Ring gear assembly 112 carries a spring locking ring 126. Clutch assembly 120 is provided with annular recesses 128 and 130.

The clutch assembly sleeve 120 extends outside of the housing H as does also the knob 38 and the sleeve portion 132 of the second stage ring gear assembly 112.

OPERATION

The primary purpose of this dental handpiece apparatus is to provide a high value inertial element which allows maximum speed on the turbine wheel while maintaining a low output speed with high output torque values through the use of dual planetary gear reducing systems. With a power source of this type available, the dentist is able to achieve greater versatility from his existing air control equipment by using this equipment; where, previously, only electrically operated, dental "engines" provided sufficient power.

The power required to operate the apparatus is a gas under pressure which enters the housing 40 through passage 50. From here the gas passes directly to the cross pasage 56 in which is mounted the switch 54. The switch directs the gas to either one of the two annuluses 72 or 74 for either forward or reverse rotation of the drive spindle 22. Directional openings 76 and 78 in the nozzle ring 70 are provided around the annuluses 72 and 74 to both direct the incoming gas against the buckets of the turbine wheel 52 and to accelerate the gas to greater velocity. This, in turn, applies force at the theoretical pitch diameter of the turbine wheel buckets which is transmitted through the wheel 52 as the product of the force and the perpendicular distance to the pitch diameter of the first stage sun gear 90 mounted hereon. This inertia, or torque in the form of rotary motion, is transmitted through the first stage sun gear 90 to the first stage planet gear assembly 94. The rotating first stage sun gear 90 imparts a rotary motion to the first stage planet gears 98. These planet gears 98 in turn attempt to transmit this rotary motion to the first stage ring gear; however, since the first stage ring gear is mounted solidly in the housing H, the planet gears "walk" around the first stage ring gear 92 carrying the first stage planet gear assembly 94 with them. This form of planetary reduction effectively increases the transmitted torque as $$D = 1 + \frac{C}{A}$$

where C is the number of teeth on the stationary ring gear and A is the number of teeth on the sun gear. Where 60 is the number of teeth on the ring gear 92 and 20 is the number of teeth on the sun gear 90, the value of transmitted torque D is 4.

Now, if the clutch sleeve assembly 120 is slid forward such that the pins 118 pass through the second stage ring gear assembly 112 and in the holes 116 provided in the second stage planet gear assembly 104, which is locked to the drive spindle 22 by means of the set screws 106, we effectively "lock" the first stage gear assembly 104 to the shaft or drive spindle 22 by locking the second stage planetary gear assembly 104 to the second stage ring gear assembly 112, and thus "short out" the second stage of reduction giving us a 4 to 1 reduction overall.

If a low range is preferred, we simply slide the clutch assembly sleeve 120 back so that the clutch pins 118 engage the scallops 4 in the cap 2. This operation locks the second stage ring gear assembly 112 to the housing H through the cap 2 and frees the second stage planet gear assembly 104 so as to permit it to rotate within the ring gear 114.

It will now be obvious that the second stage planetary gear assembly 104 will be operating in the same manner as the first stage planetary gear assembly 94 in that the second stage sun gear 102 which is mounted on the first stage planetary gear 94, imparts a rotary motion to the second stage planetary gears 108 which, in turn, "walk" around the second stage ring gear 114 carrying the second stage planetary gear assembly 104 with them. In this second stage, however, the values for C and A are different such as for example, 50 and 22 respectively. This gives a second stage value for D of 3.272. Thus, taking into consideration the 4 to 1 reduction achieved by the first stage, we have an overall reduction of 13.088 to 1 through the two stages.

It will be obvious that various other reducations can be obtained by changing the number of teeth and the size of the planetary gears, etc. Furthermore it will also be obvious, that additional stages may be provided operating in a manner similar to that heretofore described.

While the invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and fall within the scope of the invention or the limits of the appended claims.

Having thus described my invention, what I claim is:

1. A multispeed drive for a dental handpiece and the like comprising:
    (a) a first housing having front and rear portions
    (b) a tool holding chuck means supported by said housing and extending from said front portion
    (c) a drive shaft in said housing and said chuck means
    (d) a first stage planetary drive assembly in said housing mounted rearwardly of said chuck means and having a first transmitting torque value
    (e) a second stage planetary drive assembly being mounted in said housing rearwardly of said first stage planetary drive assembly and connected to said first stage planetary drive assembly and to said drive shaft and having a second transmitting torque value differing from said first transmitting torque value
    (f) means for driving said first stage planetary drive assembly
    (g) means for shorting out said second stage planetary drive assembly mounted in said housing rearwardly of said second stage planetary drive assembly and having operative and non-operative positions
    (h) said means for shorting out including first clutch means rotatable in the operative position spaced radially from said shaft and out of engagement therewith and slidably mounted longitudinally on said second stage planetary drive assembly
    (i) said housing including second clutch means engageable with said first clutch means, and
    (j) one of said clutch means including openings therein, and the other of said clutch means including means for engaging at least one of said openings when said shorting out means is in non-operative position thereby to prevent rotation of said shorting out means
(k) said means for shorting out also including first locking means
(l) said second stage planetary drive assembly including second locking means cooperating with said first locking means for locking said second planetary drive assembly, and
(m) one of said locking means including openings therein and the other of said locking means including means for engaging at least one of said openings when said shorting out means is in operative position thereby to permit rotation of said shorting out means
(n) whereby selective engagement and disengagement of said locking and clutch means permits driving of said drive shaft at different speeds.

2. A multispeed drive as in claim 1 and wherein:
(a) said means for driving said first stage drive assembly is a turbine wheel.

3. A multispeed drive as in claim 2 and wherein:
(a) said second locking means includes openings in said second stage planetary drive assembly, and
(b) said first locking means includes at least a pin portion in said shorting out means engaging said openings in said second locking means.

4. A multispeed drive as in claim 3 and wherein:
(a) said second clutch means includes openings in said housing, and
(b) said first clutch means includes a pin portion in said second stage planetary drive assembly for engaging said openings in said housing.

5. A multispeed drive as in claim 4 and wherein:
(a) said housing includes a cap, and
(b) said second clutch means openings are in said cap.

6. A multistage drive as in claim 1 and wherein:
(a) said means for driving said first stage drive assembly is a turbine wheel,
(b) said housing including means for reversing the direction of travel of said turbine wheel.

7. A multistage drive as in claim 6 and wherein:
(a) said means for reversing the direction of travel of said turbine wheel includes a switch housing, and
(b) push button valve means mounted in said switch housing.

8. A multistage drive as in claim 7 and wherein:
(a) said second stage drive assembly includes a sleeve projecting outside of said first housing.

9. A multistage drive as in claim 8 and wherein:
(a) said means for shorting out includes a sleeve mounted on said second stage drive assembly sleeve and projecting outside of said first housing.

10. A multistage drive as in claim 9 and wherein:
(a) said means for shorting out sleeve includes manual gripping means.

References Cited
UNITED STATES PATENTS

| | | | |
|---|---|---|---|
| 144,499 | 11/1873 | Betts | 74—785 |
| 252,537 | 1/1882 | Stewart | 74—785 |
| 2,137,778 | 11/1938 | McCullough | 74—768 |
| 2,331,684 | 10/1943 | Henningsen | 74—785 |
| 3,055,236 | 9/1962 | Born, Jr. | 74—785 |
| 3,077,795 | 2/1963 | Chambers et al. | 74—768X |
| 3,115,204 | 12/1963 | Dence | 74—769X |
| 3,292,459 | 12/1966 | Krzyszczuk | 74—785X |

CARLTON R. CROYLE, Primary Examiner

T. C. PERRY, Assistant Examiner

U.S. Cl. X.R.

74—785